United States Patent
Wingett et al.

(10) Patent No.: US 10,330,046 B2
(45) Date of Patent: Jun. 25, 2019

(54) THRUST REVERSER ACTUATOR WITH PRIMARY LOCK

(71) Applicant: HONEYWELL INTERNATIONAL INC., Morris Plains, NJ (US)

(72) Inventors: Paul T. Wingett, Mesa, AZ (US); Kevin K. Chakkera, Chandler, AZ (US); Ron Vaughan, Gilbert, AZ (US); Dan Birchak, Gilbert, AZ (US); Albert Kang, Chandler, AZ (US); Rich Gockel, Mesa, AZ (US); Bill Ryan, Phoenix, AZ (US); Brent Bristol, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 570 days.

(21) Appl. No.: 14/923,586

(22) Filed: Oct. 27, 2015

(65) Prior Publication Data
US 2016/0047334 A1 Feb. 18, 2016

Related U.S. Application Data

(62) Division of application No. 13/564,444, filed on Aug. 1, 2012, now Pat. No. 9,188,081.
(Continued)

(51) Int. Cl.
*F02K 1/62* (2006.01)
*F02K 1/76* (2006.01)
(Continued)

(52) U.S. Cl.
CPC .............. *F02K 1/766* (2013.01); *B64C 13/28* (2013.01); *F02K 1/625* (2013.01); *F02K 1/763* (2013.01);
(Continued)

(58) Field of Classification Search
CPC . F02K 1/76; F02K 1/763; F02K 1/766; F02K 1/625; F16H 25/22; F16H 25/2454;
(Continued)

(56) References Cited

U.S. PATENT DOCUMENTS 3,543,598 A * 12/1970 Lanzenberger .......... B23Q 5/40
188/82.1
4,149,430 A * 4/1979 F'Geppert ............... F16D 59/02
477/23
(Continued)

OTHER PUBLICATIONS

USPTO Office Action for U.S. Appl. No. 13/564,444 dated Jan. 29, 2015.
(Continued)

*Primary Examiner* — Alain Chau
(74) *Attorney, Agent, or Firm* — Lorenz & Kopf, LLP

(57) ABSTRACT

Actuator assembly includes a housing assembly, a ball screw, a ball nut, and a lock. The ball screw is rotationally mounted on and extends from the housing assembly, is coupled to receive an actuator drive torque, and is configured, upon receipt thereof, to rotate. The ball nut is rotationally supported on the ball screw and is configured, in response to rotation of the ball screw, to translate thereon between a stowed position and a deployed position. The lock is disposed at least partially within the housing assembly and is configured to move between a lock position and an unlock position. The lock prevents the ball nut from translating out of the stowed position when the lock is in the lock position and the ball nut is in the stowed position.

6 Claims, 10 Drawing Sheets

Related U.S. Application Data

(60) Provisional application No. 61/622,133, filed on Apr. 10, 2012.

(51) Int. Cl.
  B64C 13/28 (2006.01)
  F16H 25/20 (2006.01)
  F16H 25/24 (2006.01)

(52) U.S. Cl.
  CPC ............ F16H 25/2454 (2013.01); *F02K 1/76* (2013.01); *F16H 2025/209* (2013.01); *Y10T 74/18704* (2015.01); *Y10T 403/32524* (2015.01)

(58) Field of Classification Search
  CPC ............... F16H 25/20; F16H 2025/209; F16H 25/2204; Y10T 74/18704; Y10T 403/32524; B64C 13/00; B64C 13/14; B64C 13/28
  USPC ......................................................... 74/89.39
  See application file for complete search history.

(56) References Cited

U.S. PATENT DOCUMENTS

| | | | |
|---|---|---|---|
| 4,463,661 A | 8/1984 | Tootle | |
| 4,491,059 A * | 1/1985 | Martin | F02K 1/76 92/14 |
| 5,448,884 A * | 9/1995 | Repp | F02K 1/76 239/265.31 |
| 5,826,823 A | 10/1998 | Lymons et al. | |
| 5,960,626 A * | 10/1999 | Baudu | F02K 1/76 244/110 B |
| 6,045,091 A | 4/2000 | Baudu et al. | |
| 6,129,333 A | 10/2000 | Ma | |
| 6,467,363 B2 | 10/2002 | Manzanares et al. | |
| 6,487,846 B1 * | 12/2002 | Chakkera | F02K 1/766 239/265.27 |
| 6,519,929 B2 | 2/2003 | Ahrendt | |
| 6,786,039 B2 | 9/2004 | Chakkera et al. | |
| 6,935,097 B2 | 8/2005 | Eschborn | |
| 7,946,105 B2 | 5/2011 | Bristol et al. | |
| 8,042,417 B2 | 10/2011 | Davies et al. | |
| 8,113,076 B2 | 2/2012 | Daul | |
| 8,181,905 B2 | 5/2012 | McDonough et al. | |
| 8,978,356 B2 * | 3/2015 | Burgess | F02K 1/06 60/226.2 |
| 9,086,035 B2 * | 7/2015 | Jones | F02K 1/763 |
| 2003/0066284 A1 | 4/2003 | Chakkera et al. | |
| 2007/0220998 A1 * | 9/2007 | Kopecek | B64C 13/28 74/89.39 |
| 2009/0090203 A1 | 4/2009 | Jones et al. | |
| 2010/0089191 A1 | 4/2010 | Marin Martinod | |
| 2010/0162838 A1 * | 7/2010 | Hirai | F16H 25/2454 74/89.33 |
| 2011/0072780 A1 | 3/2011 | Somerfield et al. | |
| 2011/0073421 A1 | 3/2011 | Jones et al. | |
| 2011/0226075 A1 | 9/2011 | Nguyen et al. | |
| 2011/0232406 A1 | 9/2011 | Somerfield et al. | |
| 2013/0152717 A1 * | 6/2013 | Kopecek | B64C 13/28 74/89.39 |
| 2013/0186219 A1 * | 7/2013 | Jones | F02K 1/763 74/89.39 |

OTHER PUBLICATIONS

USPTO Interview Summary for U.S. Appl. No. 13/564,444 dated May 1, 2015.
USPTO Notice of Allowance for U.S. Appl. No. 13/564,444 dated Jul. 17, 2015.
EP Examination Report for Application No. 13 160 504.0 dated Nov. 17, 2017.
EP Search Report for Application No. 13160504.0-1607 / 2650519 dated Nov. 6, 2017.

* cited by examiner

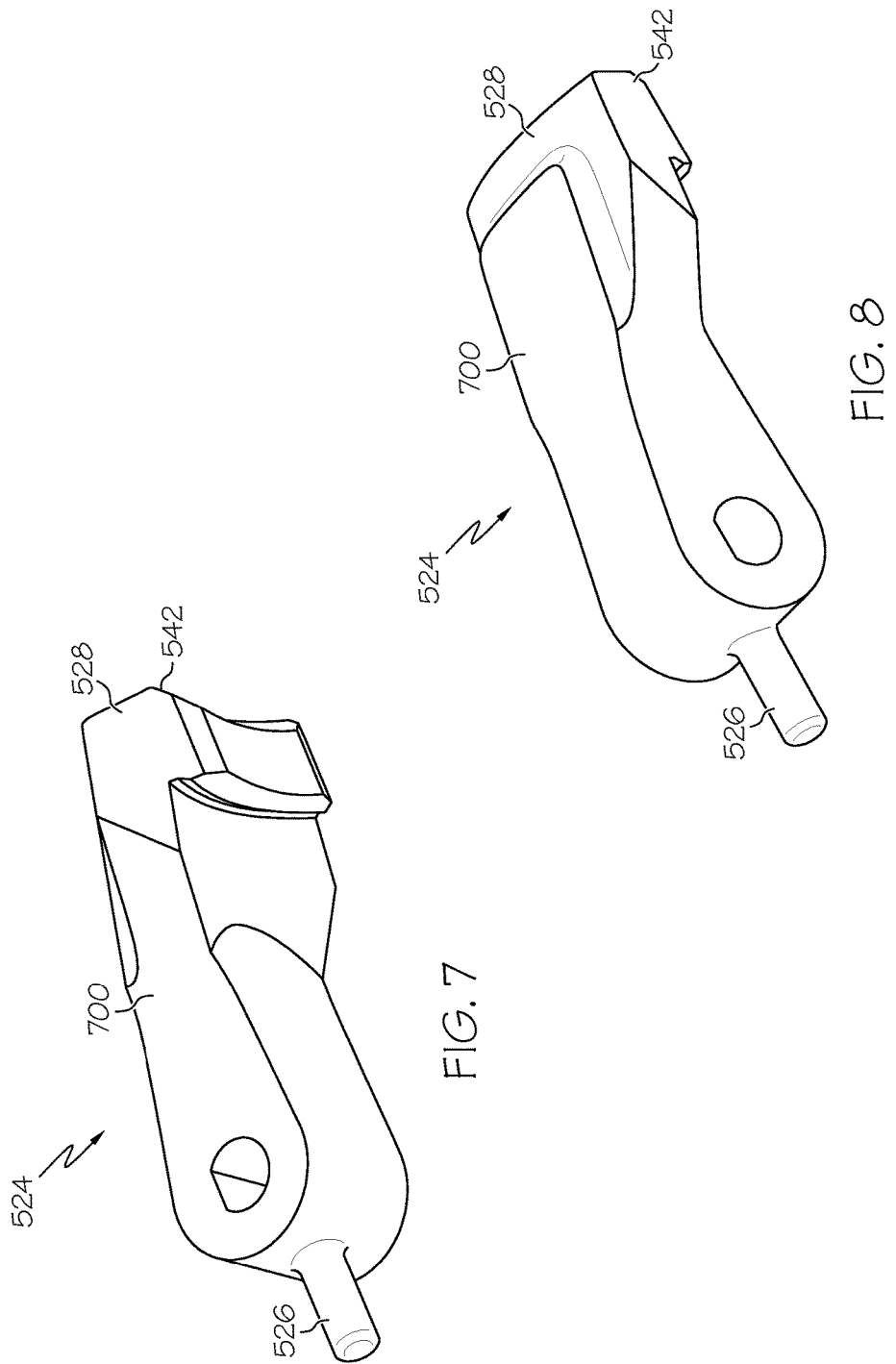

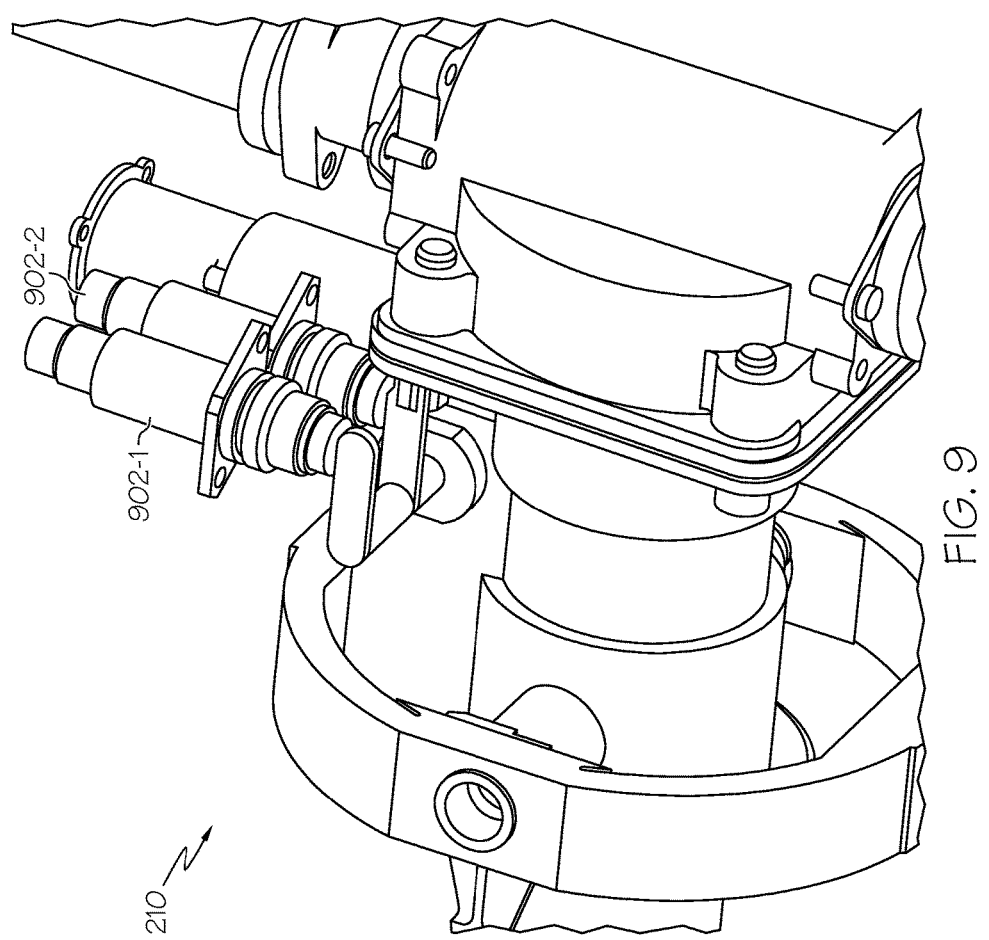

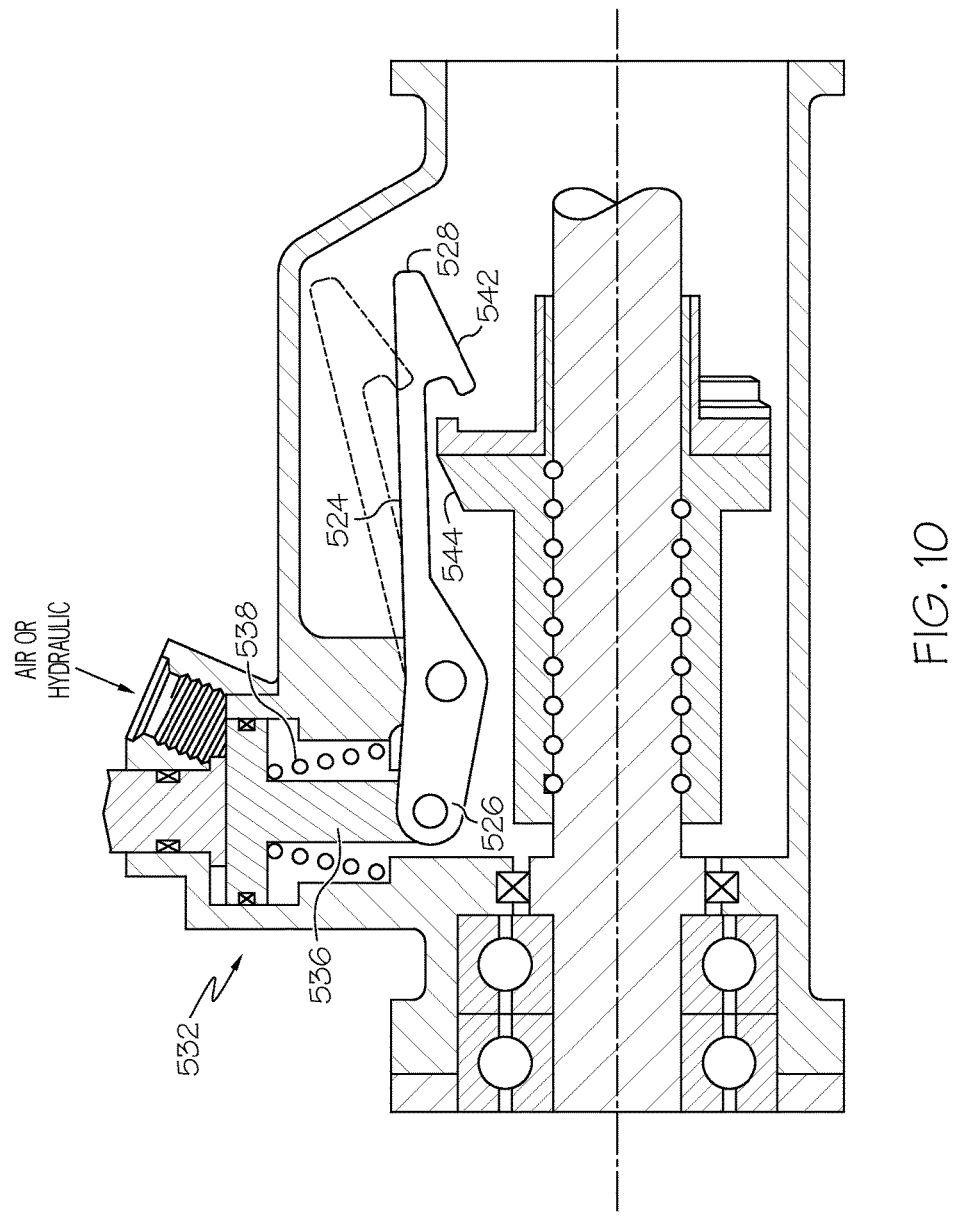

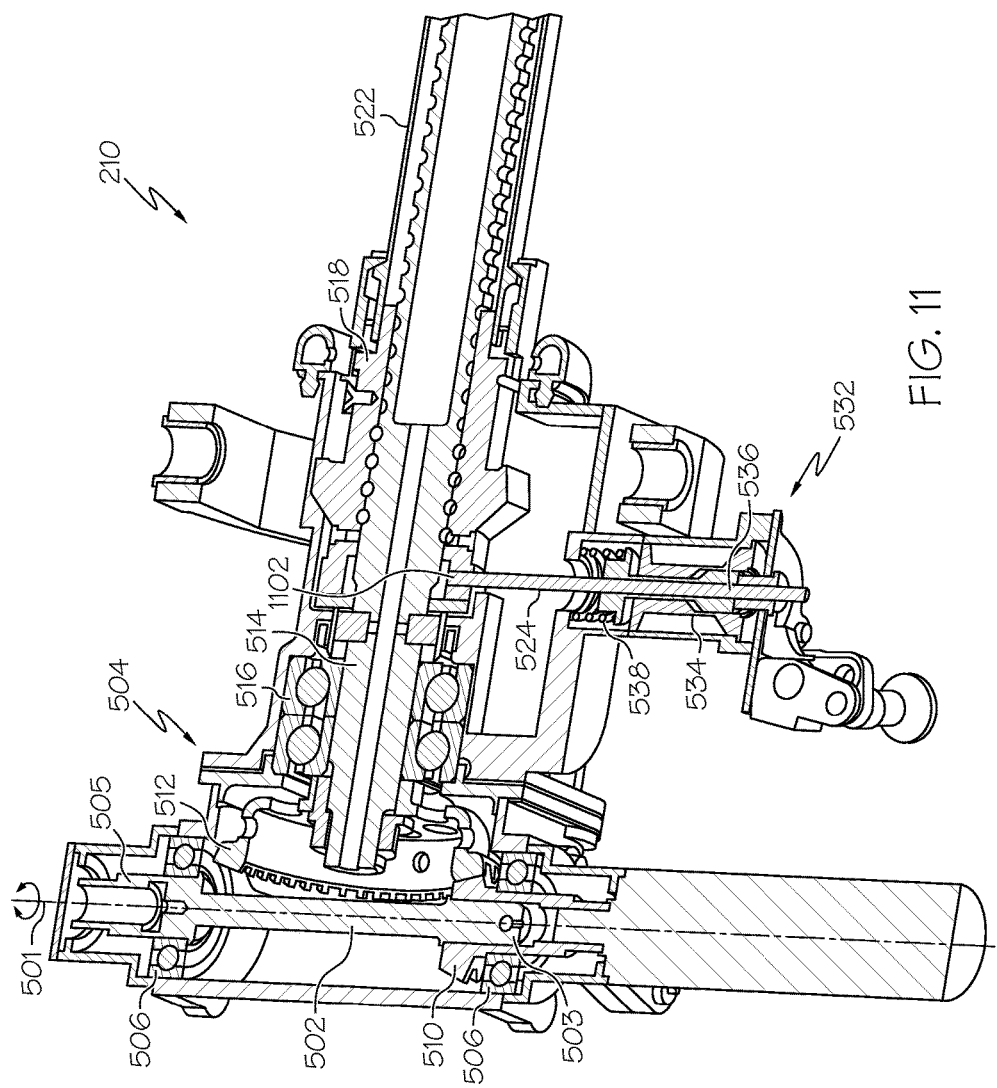

THRUST REVERSER ACTUATOR WITH PRIMARY LOCK

CROSS-REFERENCE TO RELATED APPLICATION

This application claims the benefit of U.S. Provisional Application No. 61/622,133, filed Apr. 10, 2012, and is a divisional of U.S. application Ser. No. 13/564,444, filed Aug. 1, 2012.

TECHNICAL FIELD

The present invention relates to a thrust reverser actuation system, and more particularly to an actuator, for a thrust reverser actuator that includes a primary lock.

BACKGROUND

When jet-powered aircraft land, the landing gear brakes and imposed aerodynamic drag loads (e.g., flaps, spoilers, etc.) of the aircraft may not be sufficient to slow the aircraft down in the desired amount of runway distance. Thus, jet engines on most aircraft include thrust reversers to enhance the stopping power of the aircraft. When deployed, thrust reversers redirect the rearward thrust of the jet engine to a forward direction to decelerate the aircraft. Because the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the stopping power of the aircraft, thereby shortening the stopping distance during landing. Hence, thrust reversers are primarily deployed during the landing process to slow the aircraft. Thereafter, when the thrust reversers are no longer needed, they are returned to their original, or stowed, position and are locked.

The thrust reversers in each of the above-described designs are moved between the stowed and deployed positions by means of actuators. One or more of these actuators may include a locking device to prevent unintended thrust reverser movement. While these locking devices are generally safe, they tend to be complex and heavy for certain applications, and have an envelope that is not compatible with certain applications.

Hence, there is a need for a thrust reverser actuator locking device that improves upon one or more of the above-noted drawbacks. Namely, a locking device that is not complex or heavy as compared to known locks, and/or does not significantly increase actuator system size and/or weight. The present invention satisfies one or more of these needs.

BRIEF SUMMARY

In one embodiment, an actuator assembly includes a housing assembly, a ball screw, a ball nut, and a lock. The ball screw is rotationally mounted on and extends from the housing assembly, is coupled to receive an actuator drive torque, and is configured, upon receipt thereof, to rotate. The ball nut is rotationally supported on the ball screw and is configured, in response to rotation of the ball screw, to translate thereon between a stowed position and a deployed position. The lock is disposed at least partially within the housing assembly and is configured to move between a lock position and an unlock position, and includes a lock pin adapted to receive a lock actuation force and configured, upon receipt thereof, to translate between the lock and unlock position. The lock prevents the ball nut from translating out of the stowed position when the lock is in the lock position and the ball nut is in the stowed position.

In another embodiment, an aircraft thrust reverser actuation system includes at least one power source, at least two synchronization mechanisms, and at least two actuators each coupled to at least one of the synchronization mechanisms. At least one of the actuators includes a housing assembly, a ball screw, a ball nut, and a lock. The ball screw is rotationally mounted on and extends from the housing assembly, is coupled to receive an actuator drive torque, and is configured, upon receipt thereof, to rotate. The ball nut is rotationally supported on the ball screw and is configured, in response to rotation of the ball screw, to translate thereon between a stowed position and a deployed position. The lock is disposed at least partially within the housing assembly and is configured to move between a lock position and an unlock position, and includes a lock pin adapted to receive a lock actuation force and configured, upon receipt thereof, to translate between the lock and unlock position. The lock prevents the ball nut from translating out of the stowed position when the lock is in the lock position and the ball nut is in the stowed position.

In yet another embodiment, an actuator assembly includes a housing assembly, a ball screw, a ball nut, and a lock. The ball screw is rotationally mounted on and extends from the housing assembly, is coupled to receive an actuator drive torque, and is configured, upon receipt thereof, to rotate. The ball nut is rotationally supported on the ball screw and is configured, in response to rotation of the ball screw, to translate thereon between a stowed position and a deployed position. The lock is disposed at least partially within the housing assembly and is configured to move between a lock position and an unlock position. The lock includes a lock pin, a lock pin opening, and a lock actuator. The lock pin is adapted to receive a lock actuation force and is configured, upon receipt thereof, to translate between the lock and unlock position. The lock pin opening is formed in the ball nut for receiving the lock pin therein. The lock actuator is mounted on the housing assembly and is coupled to the lock pin, the lock actuator configured to supply the lock actuation force to the lock pin Furthermore, other desirable features and characteristics of the actuator assembly and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 7 and 8 are plan views of a lock that may be used to implement the actuator assemblies depicted in FIGS. 5 and 6;

FIG. 9 depicts a partial plan view of the actuator assembly depicted in FIGS. 5 and 6;

FIG. 10 depicts a cross section view of another embodiment of an actuator assembly that may be used to implement the system of FIG. 4; and FIG. 11 depicts a cross section view of another embodiment of an actuator assembly that may be used to implement the system of FIG. 4.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. Thus, although embodiments are, for convenience, described herein as being implemented in a cascade-type thrust reverser system in which transcowls are used as moveable thrust reverser components, it should be appreciated that the described embodiments can be implemented in other thrust reverser system designs, including those described above and those known in the art.

Figure 1:
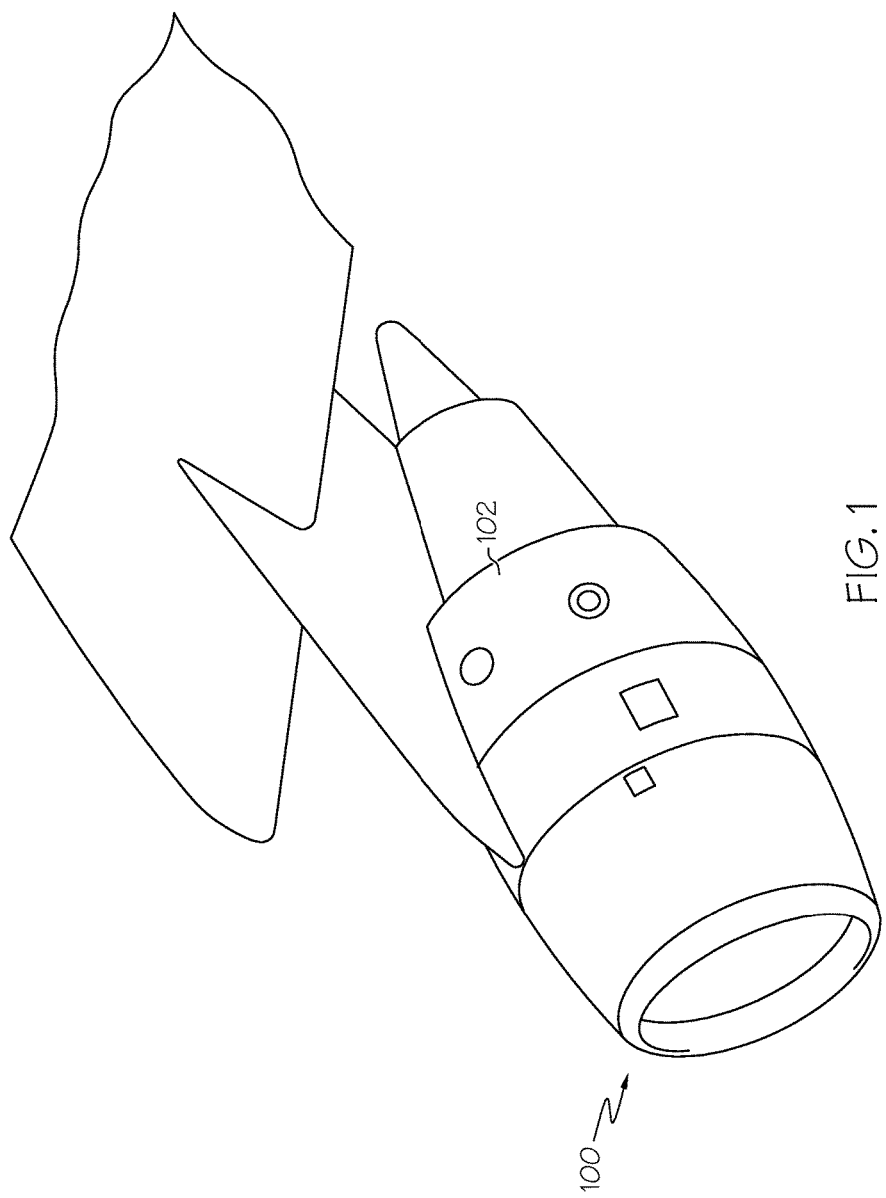
FIG. 1 is a perspective view of an aircraft engine.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 that are positioned circumferentially on the outside of the fan case 100, and implement movable thrust reverser components.

Figure 2:
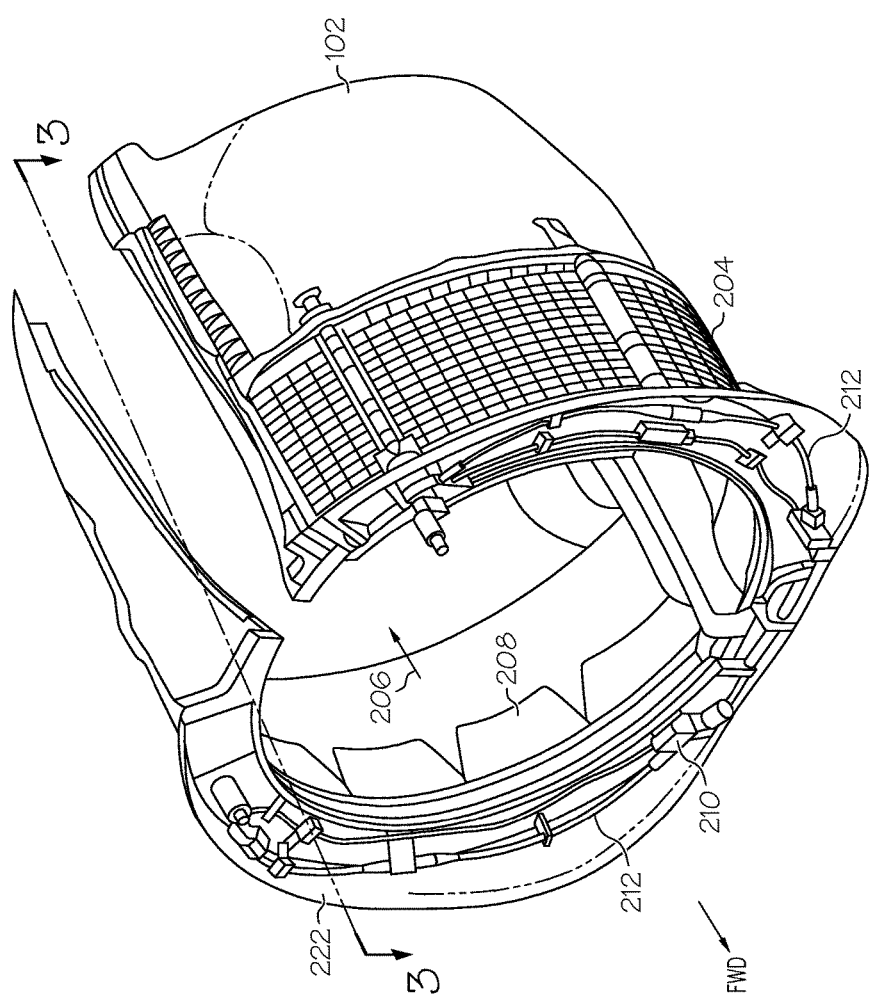
FIG. 2 is a perspective view of portions of an engine fan cowl and thrust reverser system utilized with the engine of FIG. 1.
Figure 3:
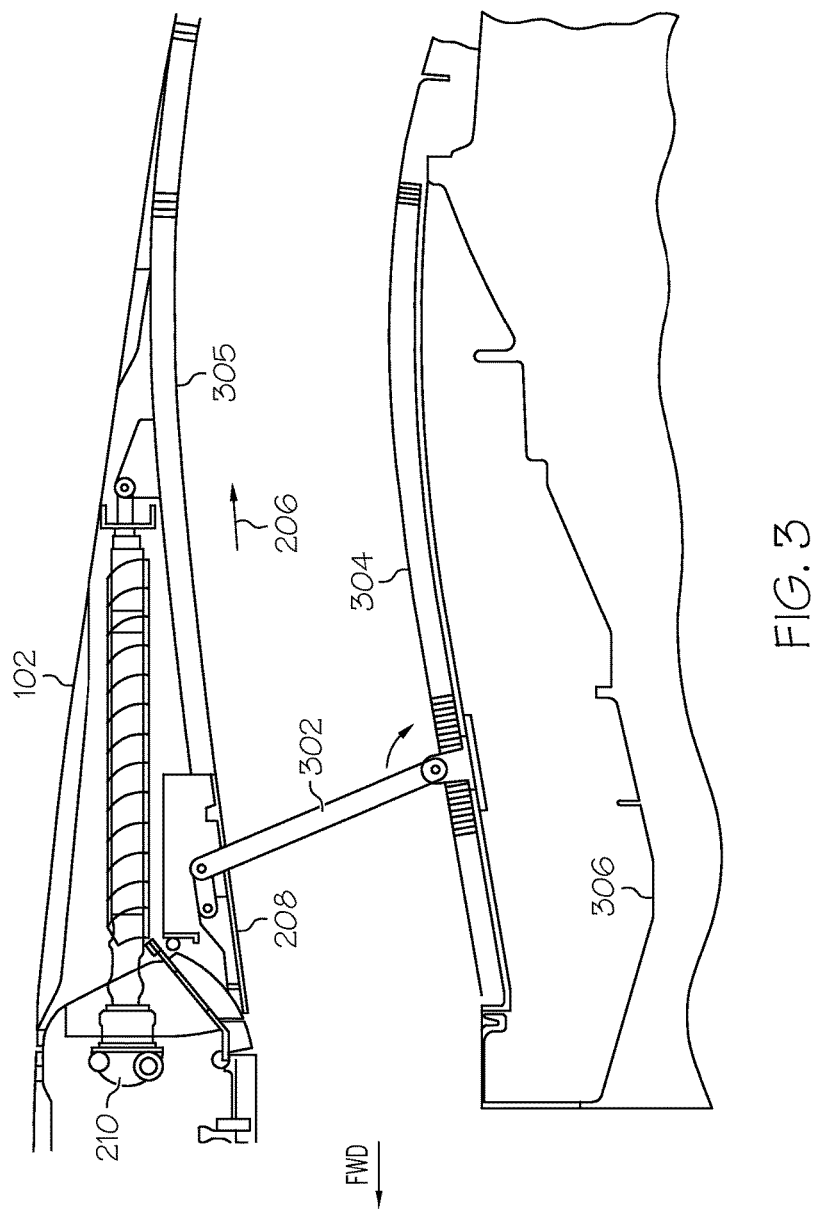
FIG. 3 is a partial cross section view taken along line 3-3 of FIG. 2.
Figure 4:
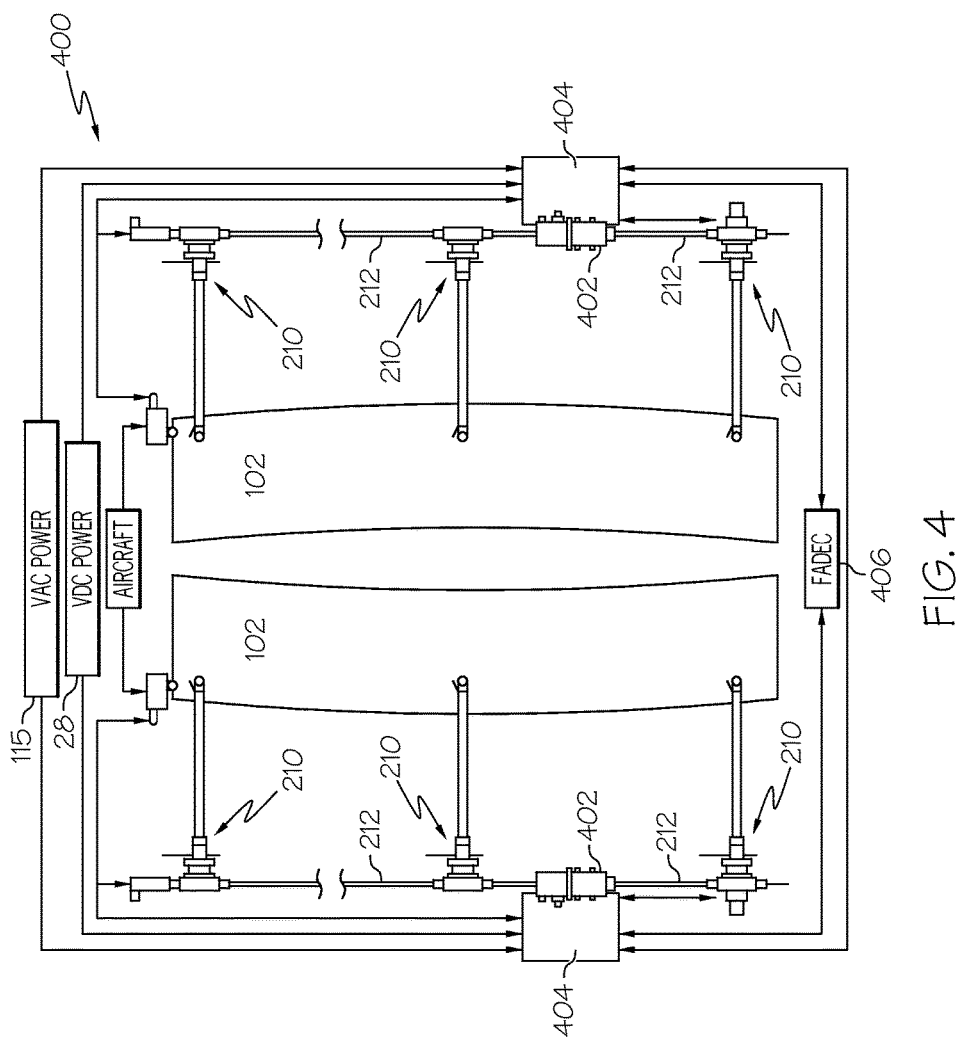
FIG. 4 is a simplified functional schematic representation of an exemplary thrust reverser actuation control system according to an embodiment of the present invention.

As shown more particularly in FIGS. 2, 3, and 4, the transcowls 102 cover a plurality of cascade vanes 204, which are positioned between the transcowls 102 and a bypass air flow path 206. A series of blocker doors 208 are mechanically linked to the transcowls 102 via a drag link 302 that is rotatably connected to a wall 304 that surrounds the engine case 306. In the stowed position, the blocker doors 208 form a portion of an outer wall 305 and are therefore oriented parallel to a bypass air flow path 206. When the thrust reversers are commanded to deploy, the transcowls 102 are translated aft, causing the blocker doors 208 to rotate into a deployed position, such that the bypass air flow path 206 is blocked. This also causes the cascade vanes 204 to be exposed and the bypass air flow to be redirected out the cascade vanes 204. The re-direction of the bypass air flow in a forward direction creates a reverse thrust and, thus, works to slow the airplane.

One or more actuator assemblies 210 per engine are used to operate the transcowls 102. The actuator assemblies 210 are mounted to, for example, a stationary torque box 222 and are coupled to the transcowls 102. As will be described in more detail further below, the actuator assemblies 210 are preferably implemented as ballscrew actuators. It is noted that the number and arrangement of actuator assemblies 210 is not limited to what is depicted in FIG. 2, but could include other numbers of actuator assemblies 210 as well. The number and arrangement of actuators is selected to meet the specific design requirements of the system.

The actuator assemblies 210 are interconnected via a plurality of drive mechanisms 212, each of which, in the particular depicted embodiment, comprises a flexible shaft. The drive mechanisms 212 ensure that the actuator assemblies 210, and thus the transcowls 102, move in a substantially synchronized manner. For example, when one transcowl 102 is moved, another transcowl 102 is moved a like distance at substantially the same time. Other drive mechanisms that may be used include gears, or any other mechanism or design that transfers power between the actuator assemblies 210.

A control system controls movement of the transcowls 102 from a locked and stowed position to an unlocked and deployed position for producing reverse thrust, and returns the transcowls 102 from the deployed position back to the stowed and locked position. A simplified functional schematic representation of an exemplary thrust reverser actuation control system is depicted in FIG. 4. The control system 400 includes the actuator assemblies 210, each coupled to a transcowl 102, and interconnected by the drive mechanisms 212. Each of actuator assemblies 210 is driven by one or more power sources. The one or more power sources may be a hydraulic power source, a pneumatic power source, or an electric power source. In a preferred embodiment, the power source is electric and, more specifically, is an electric motor 402 that is controlled by a controller circuit 404 and/or a FADEC (full-authority digital engine controller) 406. As will be discussed in more detail below, one or more of the actuator assemblies 210 includes an integral locking mechanism that prevents unintended movement of the transcowls 102 from the stowed position, and that is automatically relocked upon stowage of the thrust reversers.

Figure 5:
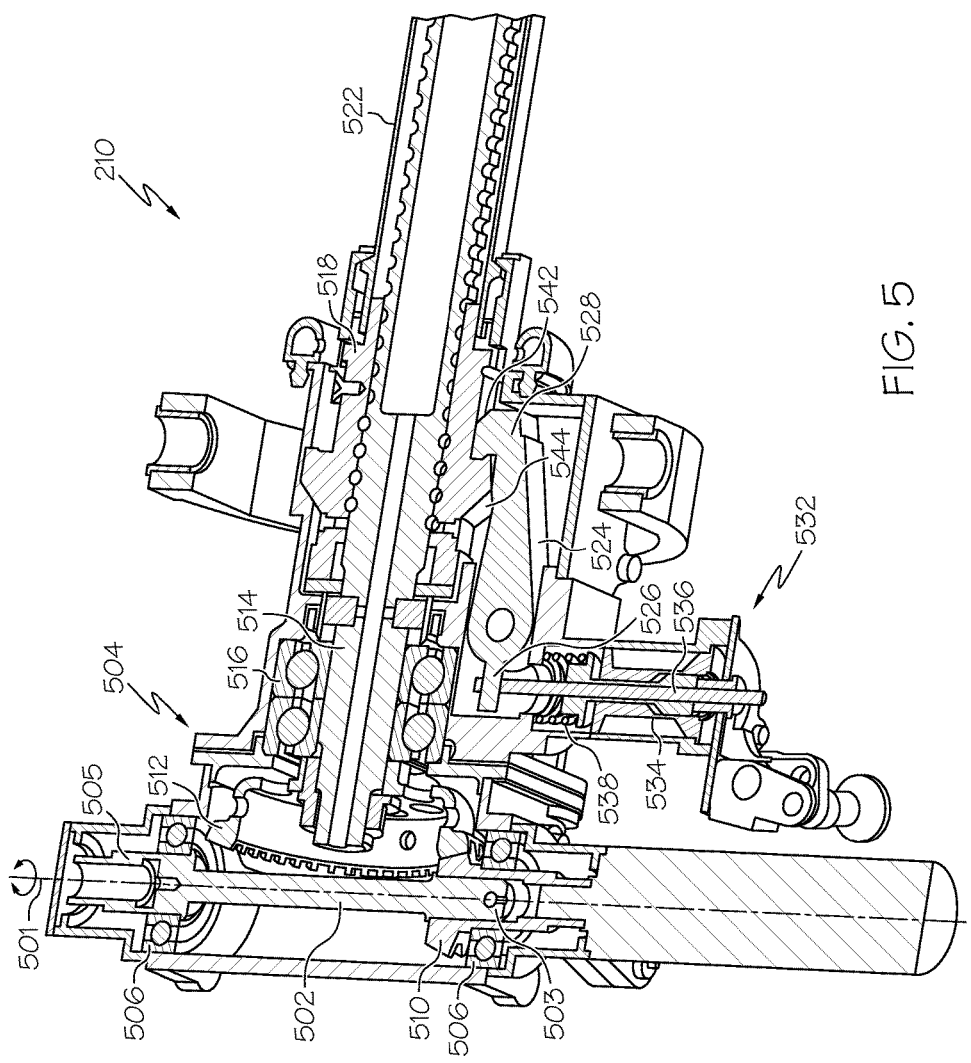
FIG. 5 is a cross section plan view of an actuator assembly with a lock that may be used to implement the system of FIG. 4, and with the lock in a lock position.
Figure 6:
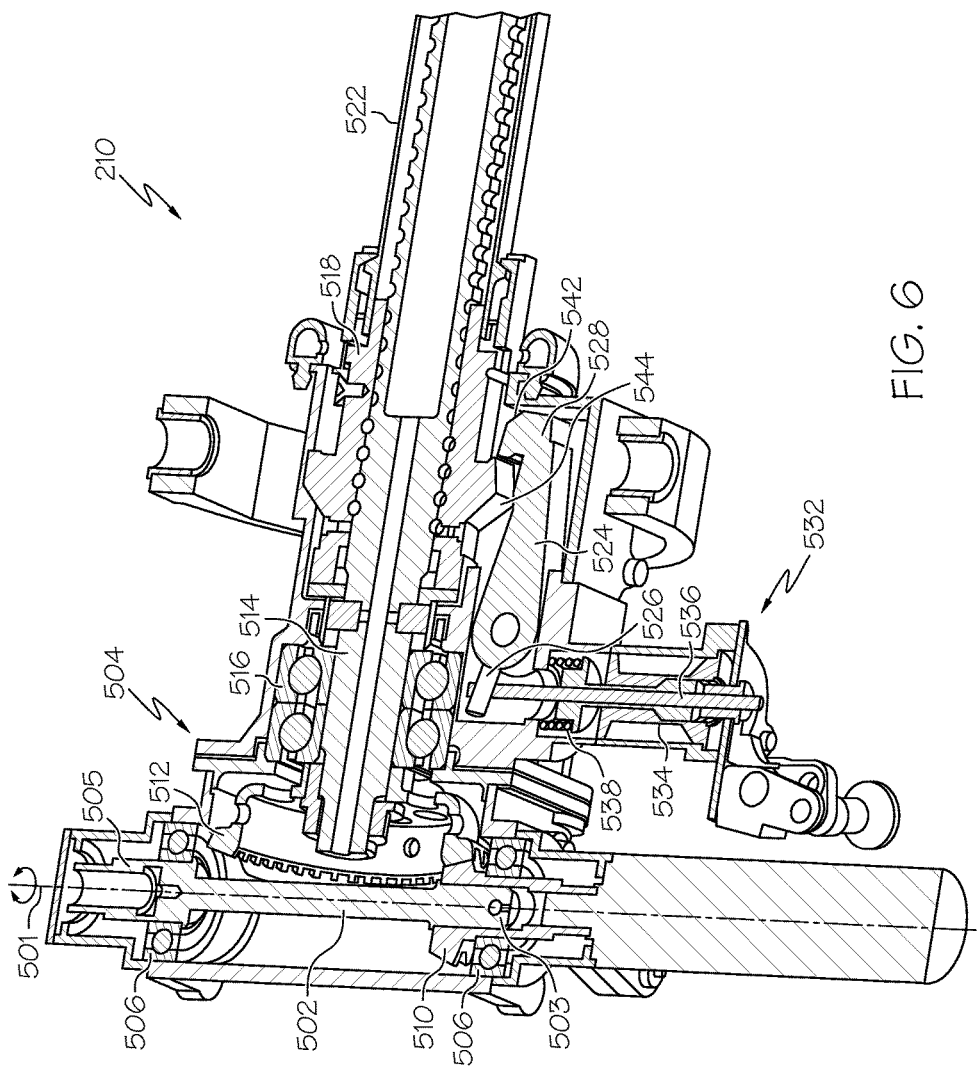
FIG. 6 is a cross section plan view of the actuator assembly depicted in FIG. 5, but with the lock in an unlock position.

With reference now to the remaining figures, a detailed description of various embodiments of an actuator assembly 210 will be provided. Turning first to FIGS. 5 and 6, each of the actuator assemblies 210 includes a drive shaft 502 rotationally mounted within a housing assembly 504 by bearing elements 506, such that the drive shaft 502 rotates about an axis of rotation 501. The drive shaft 502 has first 503 and second 505 ends that are adapted to couple the drive shaft 502 to one or more drive mechanisms 212 and/or an electric motor 404 when the actuator assembly 210 is installed in a thrust reverser system. The drive shaft 502 includes gearing 510 that meshes with a drive gear 512.

The drive gear 512 is coupled to one end of a ballscrew shaft 514, which is rotationally supported by a duplex bearing assembly 516. A ball nut 518, which is rotationally supported on the ballscrew shaft 514 by a plurality of ball bearing assemblies (not depicted in FIG. 5 or 6), is attached to one of the transcowls 102 (not illustrated in FIGS. 5A-10), via an extension tube 522. Thus, rotation of the drive shaft 502 causes rotation of the ballscrew shaft 514, which results in translation of the ball nut 518, extension tube 522, and the transcowls 102.

One or more of the actuator assemblies 210 also includes one or more locks 524 (only one depicted) that, at least in the depicted embodiment, is rotationally mounted on, or within, the housing assembly 504. The lock 524, views of which are depicted in FIGS. 7 and 8, includes a main body 700 having an actuation end 526 and an engagement end 528. The main body 700 is rotationally mounted on the housing assembly 504 between the actuation end 526 and the engagement end 528. The main body 700 receives a lock actuation force on the actuation end 526 and is configured, upon receipt thereof, to rotate between a lock position, which is the position depicted in FIG. 5, and an unlock position, which is the position depicted in FIG. 6.

The lock 524 is configured, when it is in the lock position and the ball nut 518 is in the stowed position, to prevent the ball nut 518 from translating out of the stowed position. The lock 524 is additionally configured such that, when it is in the unlock position, it does not prevent the ball nut 518 from translating. To implement this functionality, the actuation end 526 is coupled to a lock actuator 532, and the engagement end 528 selectively engages a portion of the ballnut 518 to prevent translation thereof. The lock 524, via the configuration of the lock actuator 532, is biased to the lock position and provides direct, non-electrical, locking of the ballnut 518 when the actuator assembly 210 is moved to the stowed position. The lock 524 is moved from the lock position to the unlock position upon energizing the lock actuator 532, which may occur after an over stow command is supplied to release an anti-vibration feature on the lock 524.

The lock actuator 532 includes a solenoid assembly 534, an actuation rod 536, and a spring 538. The solenoid assembly 534 is mounted on the housing assembly 504 and is coupled to the actuation rod 536. The actuation rod 536 is in turn coupled to the actuation end 526 of the lock 524. The spring 538 biases the solenoid assembly 534, actuation rod 536, and thus the lock 524, toward the lock position (see FIG. 5). When the solenoid assembly 534 is energized, it moves the actuation rod 536 inwardly, which causes the lock 524 to rotate to the unlock position, preferably after an overstow command. Though not depicted in FIGS. 5 and 6, the solenoid assembly 534 is preferably coupled to receive an input signal of appropriate polarity from external equipment such as, for example, the actuator control system controller circuit 404 or FADEC 406, to move the lock 524 to the unlocked position (see FIG. 6).

Before proceeding further it is noted that although the depicted actuator assembly 210 includes only one lock 524, this is merely exemplary of one embodiment. In other embodiments, the actuator assembly 210 may be implemented with two or more locks 524. It may be desirable to use of a plurality of locks 524 in order to more uniformly distribute the load on the ball nut 518 when the locks 524 are in the lock position and the ball nut 518 is in the stowed position.

When the actuator assembly 210 is installed in a thrust reverser system, it is desirable that the position of the lock 524 be known to the pilots or maintenance personnel. Thus, as shown more clearly in FIG. 9, redundant position sensors 902 (902-1, 902-2) are mounted on, or at least proximate to, the housing assembly 504 and, in the depicted embodiment, sense the position of portions of the lock 524 that are formed integral with the lock 524 for improved reliability. The position sensors 902, which may be one of any numerous sensors known in the art such as, for example, optical sensors, magnetic proximity sensors, or limit switches, each supply an electrical signal to the controller circuit 404 that is representative of the position of the lock 524. In this way, the actuator control system 400 is aware when the lock 524 is in the lock position (FIG. 5) and the unlock position (FIG. 6).

The actuator assemblies 210 may need to undergo period preventive, and sometimes corrective, maintenance. Many of the procedures associated with these maintenance activities require that the actuator assembly 210 be unlocked, when there is no power available to the solenoid assembly 532. Hence, to accommodate such maintenance procedures, the actuation rod 536 may also be operated manually. The actuation rod 536, when depressed, moves the lock 524 to the unlock position.

When the lock 524 is in the unlock position, the ballnut 518 is free to translate in either the deploy direction or the stow direction, regardless of the position of the ballnut 518. Conversely, when the lock 524 is in the lock position, the ballnut 518 may be prevented from translating in the deploy direction, depending upon the position of the ballnut 518. For example, when the lock 524 is in the lock position and the ballnut 518 is in the stowed position, which are the positions depicted in FIGS. 5 and 6, the ballnut 518 is prevented from translating in the deploy direction. Alternatively, when the lock 524 is in the lock position and the ballnut 518 is not in the stowed position, the ballnut 518 may translate in either the deploy direction or the stow direction. This latter functionality is provided via tapered surfaces. Specifically, the lock actuation end 526 includes a first tapered surface 542 and the ballnut 518 includes a second tapered surface 544.

Having described the structure of the actuator assembly 210 and the general operation of the various components that make it up, a detailed description of the operation of the actuator assembly 210 will now be provided. It is noted that when the actuators are installed in a thrust reverser system, such as the one depicted in FIGS. 1-4, when the pilot commands the thrust reversers to deploy, the controller circuit 404 will energize the solenoids 532 on each actuator assembly 210 that includes a lock 524. This will cause the actuation rod 536 to translate and move the lock 524 to the unlock position. The controller circuit 404 will then energize the motors 402 to rotate the actuator assemblies 210 in the deploy direction. This rotation will cause the ballnut 518 and extension tube 522 to translate. In some embodiments, the controller circuit 404 may de-energize the solenoid assemblies 532 after the ballnut 518 and extension tube 522 begin translating, which allows the lock 524 to move back to the lock position. Preferably, however, the solenoid assemblies 532 remain energized throughout the deploy and stow cycle, and are de-energized after the transcowls are stowed. Actuator assembly rotation, and thus transcowl translation, continues until the cascade vanes 204 are uncovered. As was noted above, when this occurs a reverse thrust is produced to assist in slowing the aircraft.

When the thrust reversers are no longer needed, the pilot will command the thrust reversers to move to the stowed position. In response, the controller circuit 404 will energize the motors 402 to drive the actuator assemblies 210 in the stow direction. As the thrust reversers approach the stowed position, the tapered surface 544 on the ballnut 518 engages the tapered surface 542 on the lock engagement end 528. As the ballnut 518 continues translating, it causes the lock 524 to rotate, against the force of the spring 538, toward the unlock position. When the ballnut 518 reaches the fully stowed position, the locks 524 on each actuator assembly 210 having a lock 524 are automatically moved, under the force of the spring 538, to the lock position.

As indicated previously, the disclosed embodiment is not limited to use with a cascade-type thrust reverser system, but can be incorporated into other thrust reverser design types. Moreover, the embodiment is not limited to use with an electric, electromechanical, or hydraulic thrust reverser actuation system. Indeed, the lock can be incorporated into other actuation system designs, including pneumatic and hydraulic designs (see FIG. 10). In addition, the actuator assemblies may be used to move components other than thrust reverser components. For example, the actuator assemblies may be used to move flaps, and/or slats.

It will also be appreciated that the lock 524 may be variously configured. For example, and as depicted in FIG. 11, the lock 524 may be configured as a lock pin that translates between an unlock position (not depicted) and a lock position, which is the depicted position. In the lock position, the lock is partially disposed within a lock pin opening 1102 that is formed in the ball nut 518. Though not depicted, the lock pin preferably includes a tapered tip and the ball nut 518 preferably includes a tapered ramp.

The spring-loaded actuator lock is located on the ball screw side of the actuator gearing and provides direct, non-electrical, locking of the ball nut upon actuator retraction to the stow position. The lock prevents translation of the ball screw nut. The lock is released upon energizing of a linked solenoid. The lock is packaged between the actuator gearbox and mounting hardware and thereby dramatically minimizes the envelope needed to package the actuator onto the nacelle. The system includes positive feedback to the FADEC that the lock is engaged thru redundant proximity sensors.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator assembly, comprising:
   a housing assembly;
   a ball screw rotationally mounted on and extending from the housing assembly, the ball screw coupled to receive an actuator drive torque and configured, upon receipt of the actuator drive torque, to rotate about a rotational axis;
   a ball nut rotationally supported on the ball screw and configured, in response to rotation of the ball screw, to translate along the ball screw between a stowed position and a deployed position, the ball nut having an outer surface, the outer surface having a lock pin opening formed therein;
   a lock disposed at least partially within the housing assembly and configured to move between a lock position and an unlock position, the lock consisting of a single lock pin that extends out of the housing assembly in a direction that is perpendicular to the rotational axis of the ball screw, the single lock pin adapted to translate between the lock and unlock position;
   a solenoid assembly coupled to the housing assembly and to the single lock pin, the solenoid assembly configured, upon being energized, to cause the single lock pin to translate to the unlock position; and
   a spring coupled to the solenoid assembly and configured to supply a bias force to the solenoid assembly that urges the single lock pin to translate to the lock position,
   wherein the lock prevents the ball nut from translating out of the stowed position when (i) the lock is in the lock position, (ii) the ball nut is in the stowed position, and (iii) the single lock pin is at least partially disposed within the lock pin opening.

2. The actuator assembly of claim 1, wherein the lock does not prevent the ball nut from translating when the lock is in the unlock position.

3. The actuator assembly of claim 1, further comprising:
   a lock position sensor mounted on the housing assembly and configured to sense lock position.

4. An aircraft thrust reverser actuation system, comprising:
   at least one power source;
   at least two synchronization mechanisms; and
   at least two actuators each coupled to at least one of the synchronization mechanisms, at least one of the actuators comprising:
   a housing assembly;
   a ball screw rotationally mounted on and extending from the housing assembly, the ball screw coupled to receive an actuator drive torque and configured, upon receipt of the actuator drive torque, to rotate;
   a ball nut rotationally supported on the ball screw and configured, in response to rotation of the ball screw, to translate along the ball screw between a stowed position and a deployed position, the ball nut having an outer surface, the outer surface having a lock pin opening formed therein;
   a lock disposed at least partially within the housing assembly and configured to move between a lock position and an unlock position, the lock consisting of a single lock pin that extends out of the housing assembly in a direction that is perpendicular to the ball screw, the single lock pin adapted to translate between the lock and unlock position;
   a solenoid assembly coupled to the housing assembly and to the single lock pin, the solenoid assembly configured, upon being energized, to cause the single lock pin to translate to the unlock position; and
   a spring coupled to the solenoid assembly and configured to supply a bias force to the solenoid assembly that urges the single lock pin to translate to the lock position,
   wherein the lock prevents the ball nut from translating out of the stowed position when (i) the lock is in the lock position, (ii) the ball nut is in the stowed position, and (iii) the single lock pin is at least partially disposed within the lock pin opening.

5. The system of claim 4, wherein the lock does not prevent the ball nut from translating when the lock is in the unlock position.

6. The system of claim 4, further comprising:
   a lock position sensor mounted on the housing assembly and configured to sense lock position.

* * * * *